United States Patent [19]

Inoue

[11] Patent Number: 5,683,326

[45] Date of Patent: Nov. 4, 1997

[54] TOROIDAL CONTINUOUS VARIABLE TRANSMISSION

[75] Inventor: Eiji Inoue, Sagamihara, Japan

[73] Assignee: Isuzu Motors Limited, Tokyo, Japan

[21] Appl. No.: 605,920

[22] Filed: Feb. 23, 1996

[30] Foreign Application Priority Data

Feb. 28, 1995 [JP] Japan ................... 7-063458
Feb. 28, 1995 [JP] Japan ................... 7-063460

[51] Int. Cl.$^6$ ........................ F16H 15/38; B60K 41/12
[52] U.S. Cl. ................................ 476/10; 477/50
[58] Field of Search ........................ 476/10; 477/50

[56] References Cited

U.S. PATENT DOCUMENTS

| | | | |
|---|---|---|---|
| 4,669,334 | 6/1987 | Miyaura et al. | 477/50 |
| 4,744,032 | 5/1988 | Miyaura et al. | 477/50 X |
| 5,042,326 | 8/1991 | Hibi et al. | 477/50 |
| 5,099,719 | 3/1992 | Hibi et al. | 477/50 |

FOREIGN PATENT DOCUMENTS

| | | | |
|---|---|---|---|
| 62-128267 | 8/1987 | Japan . | |
| 62-289440 | 12/1987 | Japan . | |
| 2163819 | 3/1986 | United Kingdom | 477/50 |

*Primary Examiner*—Allan D. Herrmann
*Attorney, Agent, or Firm*—Browdy and Neimark

[57] ABSTRACT

This toroidal continuous variable transmission detects a deviation of the spool valve from its neutral position and performs a feedback control to prevent the transmission ratio from converging on other than the target transmission ratio or the speed change sequence from being started again. Further, the toroidal continuous variable transmission performs control so that as the actual transmission ratio approaches the target transmission ratio, the transmission speed decreases in order to prevent an overshoot of the speed change control. When the difference between the actual transmission ratio and the target transmission ratio is smaller than a specified value, the output signals to the solenoid valves are controlled so that the pressure difference between the pilot pressures acting on the ends of the spool valves is proportional to the difference between the actual transmission ratio and the target transmission ratio. When the difference between the actual transmission ratio and the target transmission ratio exceeds the specified value, the target transmission speed is set according to the difference and the output signals to the solenoid valves are controlled so that the pressure difference between the pilot pressures acting on the ends of the spools is proportional to the difference between the actual transmission speed and the target transmission speed.

7 Claims, 11 Drawing Sheets

TOROIDAL CONTINUOUS VARIABLE TRANSMISSION

BACKGROUND OF THE INVENTION

1. Field of the Invention

The present invention relates to a toroidal continuous variable transmission with a speed change unit that comprises an input disk and an output disk arranged opposite each other, a pair of power rollers which rotate in contact with both of the disks to transmit the input disk rotation to the output disk while continuously changing the speed of the input disk rotation according to a tilt angle, and a trunnion supported on the power rollers.

2. Description of the Prior Art

The toroidal continuous variable transmission mounted in automobiles is generally a double cavity type toroidal continuous variable transmission, which has two speed change units arranged on the same axis. The toroidal continuous variable transmission comprises: an input shaft that receives the engine output; input disks supported in such a way as to be rotatable relative to the input shaft; output disks arranged opposite the input disks and supported rotatable with respect to the input shaft; tiltable power rollers arranged between the paired, opposing input disks and output disks to transmit torque from the input disks to the output disks; a connecting member to couple together the opposing output disks; and pressing means arranged between the input disks and paired flange portions provided to the input shaft to act on the input disks to change the pressing force of the power rollers according to the magnitude of the input torque. The power rollers are tilted to change the rotation speed of the input disks continuously when transmitting the torque from the input disks to the output disks. The toroidal continuous variable transmission tilts the power rollers by a speed change control device.

A variety of kinds of toroidal continuous variable transmission have been known (for example, Japan Utility Laid-Open No. 128267/1987 and Japan Patent Laid-Open No. 289440/1987).

One such toroidal continuous variable transmission is shown in FIG. 9. As shown in the figure, a pair of power rollers 2 are arranged opposite each other between opposing input disk 1 and output disk 1' and are each rotatably supported on support members called trunnions 4. That is, the power rollers 2 are supported on the trunnions 4 through eccentric shafts 5. The trunnions 4 are each pivotably supported on the transmission casing and also axially movable. The trunnion 4 has a tilt axis 6, in the direction of which it can be moved and about which it can be pivoted. The tilt axis 6 of the trunnion 4 is rigidly fitted with a piston 7, which is slidably installed in a hydraulic cylinder 8 formed in the transmission casing. In the hydraulic cylinder 8 there are formed two cylinder chambers divided by the piston 7—a speed-increase side cylinder chamber 8a and a speed-decrease side cylinder chamber 8b.

The cylinder chambers 8a, 8b of the hydraulic cylinder 8 communicate with a spool valve 10 through oil passages 9a, 9b. A spool 11 slidably installed in the spool valve 10 is held at the neutral position by springs 12 disposed at the axial ends of the valve. The spool valve 10 is formed with an Sa port at one end and with an Sb port at the other end. The Sa port is supplied with a pilot pressure Sa through a solenoid valve 13a and the Sb port with a pilot pressure Sb through a solenoid valve 13b. The spool valve 10 has a PL port communicating with the line pressure (hydraulic pressure source), an A port communicating with the speed-increase side cylinder chamber 8a through the oil passage 9a, a B port communicating with the speed-decrease side cylinder chamber 8b through the oil passage 9b, and two T ports connected to a tank 50. The solenoid valves 13a, 13b are operated according to control signals output from a controller 14.

One of the tilt axes 6 is connected at one end with a precess cam 15, against which one end of a lever 16 pivotably supported at the center is pressed. The other end of the lever 16 is connected to a potentiometer 17. The potentiometer 17 detects, in the form of a synthetic displacement, the axial displacement of the trunnions 4 in the direction of the tilt axes 6 and their tilt angle and supplies the detected signal to the controller 14. The speed change control device also has a car speed sensor 18, an engine revolution sensor 19, and a throttle opening sensor 20. Transmission information signals such as car speed, engine revolution and throttle opening detected by these sensors are fed to the controller 14.

The toroidal continuous variable transmission performs the speed change control by utilizing the fact that when the trunnions 4 are moved toward either direction of the tilt axes (in the axial direction of the tilt axes 6) from the neutral position (the position where the rotation axes of the power rollers 2 cross the rotation axes of the input disk 1 and output disk), the trunnions 4 tilt about the tilt axes 6 in a direction and at a speed that correspond to the direction of displacement and the amount of displacement, thereby changing the rotation speed.

Next, the operation of the toroidal continuous variable transmission is described by referring to a flow chart of FIG. 10. At a point when the speed change operation is started, the trunnions 4 are at the neutral position where the rotation axes of the power rollers 2 cross the rotation axes of the input disk 1 and the output disk 1'. From the moment the engine is started until is stops, the controller 14 performs the main routine of the speed change control. First, the controller 14 calculates a target transmission ratio $e_0$ based on the transmission information. The potentiometer 17 detects a transmission ratio e and supplies it to the controller 14 (S1-1).

Next, according to the difference between the transmission ratio and the target transmission ratio ($e-e_0$), the controller 14 calculates a duty A to be output to the solenoid valve 13a and a duty B to be output to the solenoid valve 13b, from the following formulas (S1-2).

$$\text{duty } A = 50\% + G(e-e_0)$$

$$\text{duty } B = 50\% - G(e-e_0)$$

where G is a proportional constant as a feedback gain.

The duty means a ratio between ON duration and OFF duration in the pulse width modulation control. That is, duty (%) is given by $$\text{duty} = (\text{solenoid ON duration in one cycle/solenoid operation cycle}) \times 100$$

Then, the duty A and duty B are output to the solenoid valves 13a, 13b, respectively (S1-3).

Next, the operation of the toroidal continuous variable transmission is explained. First, the controller 14 calculates the actual transmission ratio from the synthesized displacement of the trunnions 4 detected by the potentiometer 17 and outputs to the solenoid valves 13a, 13b the duty A and duty B that are set according to the difference between the transmission ratio and the target transmission ratio. As a result, the pilot pressures Sa, Sb are supplied to the ends of the spool valve 10. At this time, when the transmission ratio is on the speed-decrease side, the pilot pressures with the relation of Sa>Sb are supplied, so that the spool 11 is shifted to left in FIG. 9 causing the oil passage 9a to communicate with the pressure source through the PL port and the oil passage 9b to communicate with the tank 50 through the T port. Hence, the pressure Pa in the oil passage 9a becomes greater than the pressure Pb in the oil passage 9b (Pa>Pb). The resulting pressure difference between the cylinder chambers 8a and 8b causes the trunnion 4 on the left side in FIG. 9 to move up and the trunnion 4 on the right side to move down. As they move vertically in this way, the trunnions 4 pivot about the tilt axes 6, starting the transmission operation on the speed-increase side. Before the transmission ratio agrees with the target transmission ratio, the oil pressures Pa and Pb of the cylinder chambers 8a and 8b reverse in magnitude (Pa<Pb), causing the trunnion on the left side to move downward, progressively reducing the displacement in the direction of the tilt shaft. During this process the transmission ratio continues to change toward the speed-increase side. Although there may be a case where the transmission ratio exceeds the target transmission ratio, the transmission ratio will, after repetitive feedback control, agree with the target transmission ratio, at which time the displacement of the trunnions 4 in the axial direction of the tilt axes becomes zero, completing the speed change operation.

In the conventional example shown in FIG. 9, when the transmission ratio agrees with the target transmission ratio, the pilot pressures Sa and Sb acting on the ends of the spool valve become equal, with the result that the displacement of the trunnions is zero. Because of manufacture-related variations of the spool valve and the springs installed at its both ends and because of their degradations, with time, however, the spool neutral position of the spool valve may deviate in either direction. In that case, the pressure Pa in the speed-increase side cylinder chamber 8a and the pressure Pb in the speed-decrease side cylinder chamber 8b do not agree, giving rise to various problems such as restarting the transmission process or causing the transmission ratio to settle at a valve different from the target transmission ratio.

Further, in the toroidal continuous variable transmission of FIG. 9, because the transmission ratio is combined with the displacement of the trunnions 4 in the axial direction of the tilt axes by the precess cam 15 and detected by the potentiometer 17, the magnitudes of Pa and Pb reverse before the transmission ratio agrees with the target transmission ratio.

Let us consider, for example, a case where the transmission ratio is on the speed-decrease side from the target transmission ratio. If the magnitudes of Pa and Pb reverse only when the transmission ratio agrees with the target transmission ratio, the transmission ratio continues to change toward the speed-increase side at a large rate of change even after the transmission ratio has reached the target transmission ratio. This results in a large overshoot. With the above toroidal continuous variable transmission of FIG. 9, however, the magnitudes of Pa and Pb reverse before the transmission ratio reaches the target transmission ratio. Because the displacement of the trunnions in the axial direction of the tilt axes starts to decrease gradually reducing the rate of change of the transmission ratio the instant the reversion takes place, the overshoot is small if the transmission ratio exceeds the target transmission ratio toward the speed-increase side.

When an abrupt stepwise speed change of large magnitude is executed as in kickdown, however, the transmission ratio (represented by a solid line), as shown in FIG. 11(c), greatly oscillates converging into the target transmission ratio (indicated by a dashed line). In the worse case, the transmission ratio may diverge instead of converging into the target transmission ratio. Under these circumstances, an issue being posed is how to realize a speed change control that does not cause an overshoot even when an abrupt stepwise speed change of large magnitude is carried out.

SUMMARY OF THE INVENTION

An object of this invention is to resolve the above issues and to provide a toroidal continuous variable transmission, which, by correcting the neutral position of the spool valves, can prevent the transmission ratio from converging on other than the target transmission ratio or the speed change sequence from being restarted, as may occur due to manufacture-related variations and changes with time of the spool valves.

Another object of this invention is to provide a toroidal continuous variable transmission, which can prevent an overshoot of the speed change control by gradually reducing the transmission speed as the transmission ratio approaches the target transmission ratio and which can also converge the transmission ratio into the target transmission ratio quickly and reliably even when an abrupt stepwise speed change of large magnitude is performed.

The present invention relates to a toroidal continuous variable transmission, which comprises: input disks and output disks arranged opposite each other; a pair of power rollers which continuously change and transmit the rotation of the input disks to the output disks according to changes in a tilt angle of the power rollers with respect to the input disks and the output disks; a pair of trunnions that each rotatably support the power rollers and can be displaced in the direction of a tilt axis; hydraulic cylinders each having two cylinder chambers to move the trunnions in the direction of the tilt axis; spool valves that cut off the cylinder chambers when spools are at a neutral position and selectively communicate the cylinder chambers to an oil pressure source and a tank when the spools are shifted from the neutral position; solenoid valves that control the positions of the spools; and a controller that outputs to the solenoid valves duties corresponding to the difference between an actual transmission ratio and a target transmission ratio; wherein when a correction execution condition is satisfied, the controller performs a correction control on the neutral position of the spool valves by integrating with respect to time the difference between the actual transmission ratio and the target transmission ratio to calculate an integrated error, determining an amount of duty correction that corresponds to the error of the neutral position of the spool valves based on the integrated error, and correcting the duty with the amount of duty correction thus determined. The duty here means an ON-OFF time ratio in the pulse width modulation control.

The duty (%) can be given as follows:

duty=(solenoid ON time in one cycle/solenoid operation cycle)×100

When the correction execution condition is met and the transmission ratio is changing, the control is performed in such a way as to lower the feedback gain supplied to the solenoid valves and, as the correction progresses, raise the feedback gain.

The controller includes: a correction execution decision means that outputs a signal when the correction execution condition is found to be satisfied; a transmission ratio change presence/absence decision means that, in response to the signal from the correction execution decision means, decides whether there is a change in the transmission ratio and outputs a signal representing the decision; a transmission ratio error calculation means to calculate an integrated error by integrating with respect to time the difference between the actual transmission ratio and the target transmission ratio; a first memory to store a table representing a predetermined correspondence between the integrated error and the amount of change of feedback gain; a feedback gain change calculation means which, when it receives a change presence signal from the transmission ratio change presence/ absence decision means, calculates the amount of change of feedback gain corresponding to the integrated error by using the correspondence table stored in the first memory and which, when it receives a change absence signal from the transmission ratio change presence/absence decision means, sets the amount of change of feedback gain to zero; a second memory that stores a table representing a predetermined correspondence between the integrated error and an amount of duty correction; a correction calculation means that calculates an amount of duty correction corresponding to the integrated error by using the correspondence table stored in the second memory; and a duty calculation means that corrects the duty based on the amount of change of feedback gain and the amount of duty correction and then outputs the corrected duty to the solenoid valves.

Regardless of whether the correction execution condition is satisfied or not, a means to calculate the duty corresponding to the difference between the actual transmission ratio and the target transmission ratio is a duty calculation means.

Further, the correction execution condition may be defined to be met when the idling state is detected. That is, the conditions under which the correction of the error of the spool valve neutral position can be executed are limited. Such conditions may includes those that require the target transmission ratio to be constant and at the same time the external inputs to the transmission (such as torque and revolution) not to vary. The conditions are met, for example, when the drive position is at "P" or "N" and the engine is found to be in the idling state. An example method of detecting the idling state of the engine involves detecting an engine revolution, an amount of depression of accelerator pedal and an engine suction pressure and checking that these values are in the specified range.

In this toroidal continuous variable transmission, when there is an error with the neutral position of the spool valve, the integrating with respect to time of the difference between the actual transmission ratio and the target transmission ratio, i.e., an error of the transmission ratio with respect to the target transmission ratio, produces a positive or negative integrated error, according to whose magnitude and sign the duty to be output to the solenoid valves is corrected. After correction is execute, the integrated error approaches zero. By repeating this correction, the error decreases to such a low level as will not pose any control problem. In this way, the spool valve's neutral position is corrected to the true neutral position.

Further, when the transmission ratio is changing, the toroidal continuous variable transmission not only corrects the neutral position of the spool valve but also changes the feedback gain supplied to the solenoid valves according to the magnitude and positive or negative sign of the integrated error. That is, because lowering the feedback gain makes the control easy and raising it enhances the response, the feedback gain to the solenoid valves is lowered at first and, as the correction proceeds, is raised until it finally approaches the normal setting value. This procedure prevents the transmission ratio from oscillating greatly.

Hence, by performing the above control, the toroidal continuous variable transmission can cause the transmission ratio to converge quickly and reach the target transmission ratio.

Because the toroidal continuous variable transmission performs control according to the integrated error between the actual transmission ratio and the target transmission ratio by detecting the neutral position of the spool valve and correcting the output signal to the solenoid valves, it is possible to prevent the transmission ratio from converging into other than the target transmission ratio and also prevent the speed change sequence from starting again after the target transmission ratio has been reached.

Further, because this speed change control device performs control in such a way that correction can be performed on the neutral position of the spool valves whenever the correction execution condition is met, it is possible to easily detect deviations of the neutral position of the spool valves caused by manufacture-related variations of the spool valves and springs and their deteriorations with time and to correct the neutral position of the spool valves to the true position, thereby assuring a stable speed change control at all times.

Further, the present invention relates to a toroidal continuous variable transmission, which comprises: input disks and output disks arranged opposite each other; a pair of power rollers which continuously change and transmit the rotation of the input disks to the output disks according to changes in a tilt angle of the power rollers with respect to the input disks and the output disks; a pair of trunnions that each rotatably support the power rollers and can be displaced in the direction of a tilt axis; hydraulic cylinders each having two cylinder chambers to move the trunnions in the direction of the tilt axis; spool valves that cut off the cylinder chambers when spools are at a neutral position and selectively communicate the cylinder chambers to an oil pressure source and a tank when the spools are shifted from the neutral position; solenoid valves that control pilot pressures acting on the ends of the spools; and a controller that sets a target transmission speed according to the difference between the transmission ratio and the target transmission ratio and controls output signals to the solenoid valves in such a way that the pressure difference between the pilot pressures acting on the ends of the spools is proportional to the difference between the transmission speed and the target transmission speed.

When the controller receives a signal indicating that the difference between the actual transmission ratio and the target transmission ratio exceeds a specified value, the controller sets the target transmission speed according to the difference between the actual transmission ratio and the target transmission ratio and controls output signals to the solenoid valves in such a way that the pressure difference between the pilot pressures acting on the ends of the spools is proportional to the difference between the actual transmission speed and the target transmission speed, and when it receives a signal indicating that the difference between the actual transmission ratio and the target transmission ratio is smaller than the specified value, the controller controls output signals to the solenoid valves in such a way that the difference between the pilot pressure acting on the ends of the spools is proportional to the difference between the actual transmission ratio and the target transmission ratio. The transmission speed can be calculated, for example, by dividing the change of the transmission ratio detected in every program cycle of the controller by a program cycle.

Alternatively, the controller includes: a transmission ratio difference calculation means which calculates the difference between the actual transmission ratio and the target transmission ratio and outputs a signal representing the difference; a control mode selection means which checks if the difference between the actual transmission ratio and the target transmission ratio is smaller than a specified valve, and which, when the difference is smaller than the specified value, selects a normal mode and, when the difference exceeds the specified value, selects a special mode; a target transmission speed calculation means which, during the special mode, calculates the target transmission speed according to the signal from the transmission ratio difference calculation means; a transmission speed calculation means which, during the special mode, calculates the transmission speed by dividing the difference between a transmission ratio detected this time and a previously detected transmission ratio by a sampling time; a transmission speed difference calculation means which calculates the difference between the transmission speed and the target transmission speed and outputs a signal representing the difference; and a duty calculation means which, during the normal mode, calculates a duty proportional to the signal supplied from the transmission ratio difference calculation means and outputs the calculated duty to the solenoid valves and which, during the special mode, calculates a duty proportional to the signal supplied from the transmission speed difference calculation means and outputs the calculated duty to the solenoid valves.

In this toroidal continuous variable transmission, the transmission speed depends on the displacement of the trunnion in the direction of the tilt axis and thus controlling the transmission speed means indirectly controlling the trunnion displacement in the direction of the tilt axis. Because the target transmission speed is set according to the difference between the transmission ratio and the target transmission ratio, the target transmission ratio becomes maximum immediately after the start of the speed change operation, followed by progressive reduction until it is zero when the transmission ratio agrees with the target transmission ratio.

Further, because the controller controls the output signal to the solenoid valves so that the pressure difference between the pilot pressure acting on the ends of the spool valves is proportional to the difference between the transmission ratio and the target transmission ratio, the trunnion moves largely in the direction of the tilt shaft immediately after the speed change operation is started, causing the transmission speed to become maximum. After this, the transmission speed oscillates progressively converging on the set target transmission speed. As the transmission speed converges to the target transmission speed, the transmission ratio approaches the target transmission ratio. When the transmission speed becomes zero, the transmission ratio agrees with the target transmission ratio.

Hence, as the transmission ratio approaches the target transmission ratio, the transmission speed oscillates gradually decreasing until the transmission ratio is almost equal to the target transmission ratio, at which time the transmission speed is almost zero. Therefore, overshoots of the speed change control can reliably be prevented.

When the control is performed so that the pressure difference between the pilot pressures acting on the ends of the spool valves is proportional to the transmission speed, there is a problem that in a region where the difference between the transmission ratio and the target transmission ratio is small, the transmission speed becomes small, lowering the precision due to the limitation of the resolution of the potentiometer.

With this speed change control device, however, when the difference between the transmission ratio and the target transmission ratio falls within a specified value, the control mode switches to the conventional one, whereby the duty corresponding to the difference between the transmission ratio and the target transmission ratio is output to the solenoid valve.

This control procedure solves the above problem, allowing a precise control even in the region where the difference is very small.

In the toroidal continuous variable transmission, when the difference between the transmission ratio and the target transmission ratio is smaller than the specified value, the output signal to the solenoid valves is controlled so that the pressure difference between the pilot pressures acting on the ends of the spool valves is proportional to the difference between the transmission ratio and the target transmission ratio. When the difference between the transmission ratio and the target transmission ratio exceeds the specified value, the target transmission speed is set according to the difference between the transmission ratio and the target transmission ratio and the output signal to the solenoid valves is controlled so that the pressure difference between the pilot pressures acting on the ends of the spools is proportional to the difference between the transmission speed and the target transmission speed.

Because the target transmission speed is set according to the difference between the transmission ratio and the target transmission ratio, the target transmission speed becomes maximum at the inception of the speed change operation and gradually decreases thereafter until it is finally zero.

Hence, the toroidal continuous variable transmission can reliably prevent an overshoot of the speed change control and ensures a stable speed change response without having to add new sensors. In the region where the difference between the transmission ratio and the target transmission ratio is very small, the signal corresponding to this difference is supplied to the solenoid valves as in the conventional case. This permits the speed change control with high precision even in the region where the difference is small.

DETAILED DESCRIPTION OF THE PREFERRED EMBODIMENTS

A first embodiment of the speed change control device of the toroidal continuous variable transmission according to this invention is described in the following by referring to the accompanying drawings. The speed change control device of the first embodiment is the same as that of the conventional device shown in FIGS. 9 and 9A, with the only difference being the configuration of controller 14 and the kind of sensors used. In addition to a car speed sensor 18, an engine revolution sensor 19 and a throttle opening sensor 20, the speed change control device has other sensors to decide whether or not the condition for executing correction is met. In the following description of the first embodiment, explanation is omitted for the parts that have the same configuration as the conventional ones shown in FIG. 9.

Figure 1:
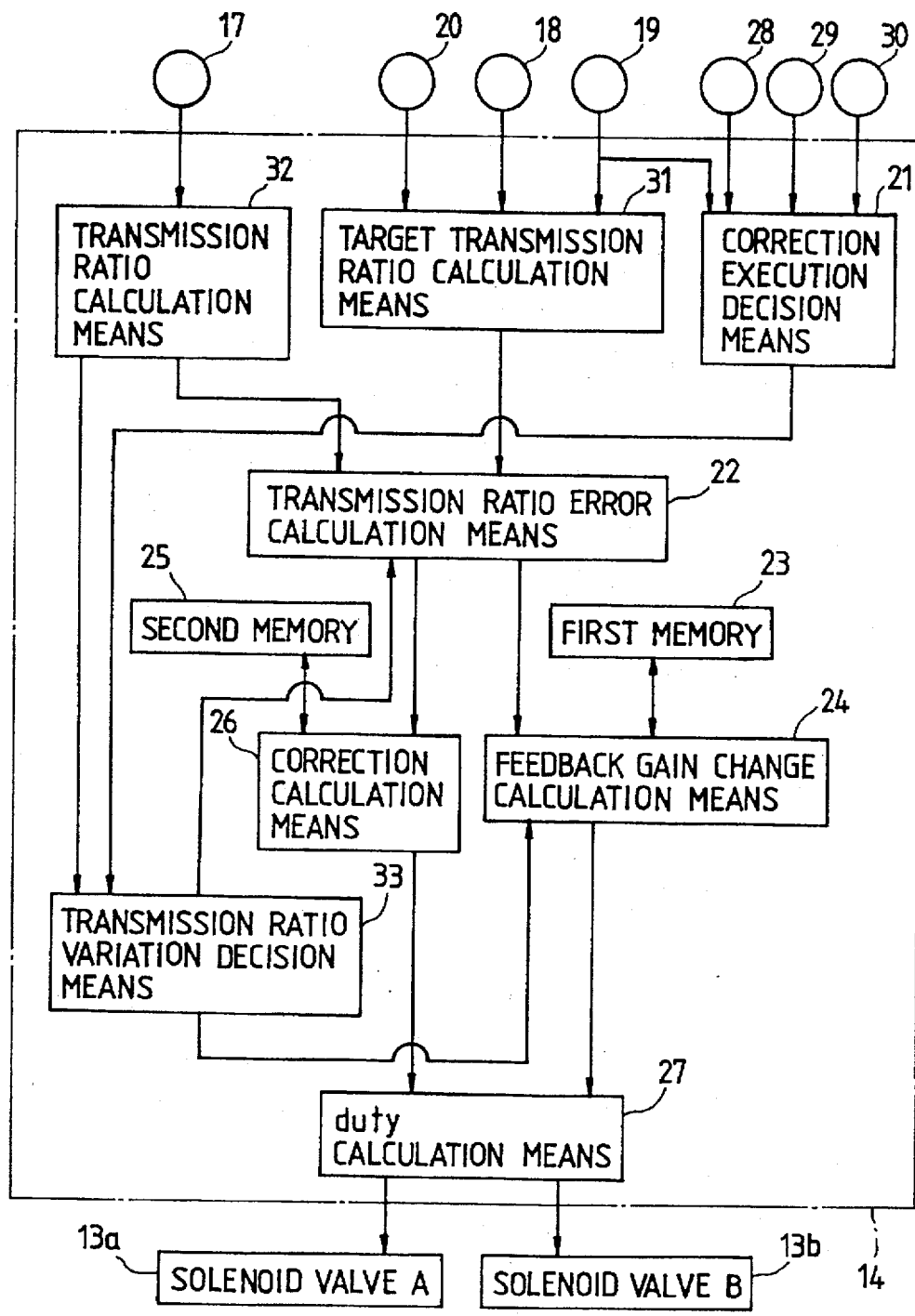
FIG. 1 is a function block diagram for the controller used in the toroidal continuous variable transmission of this invention.
Figure 9:
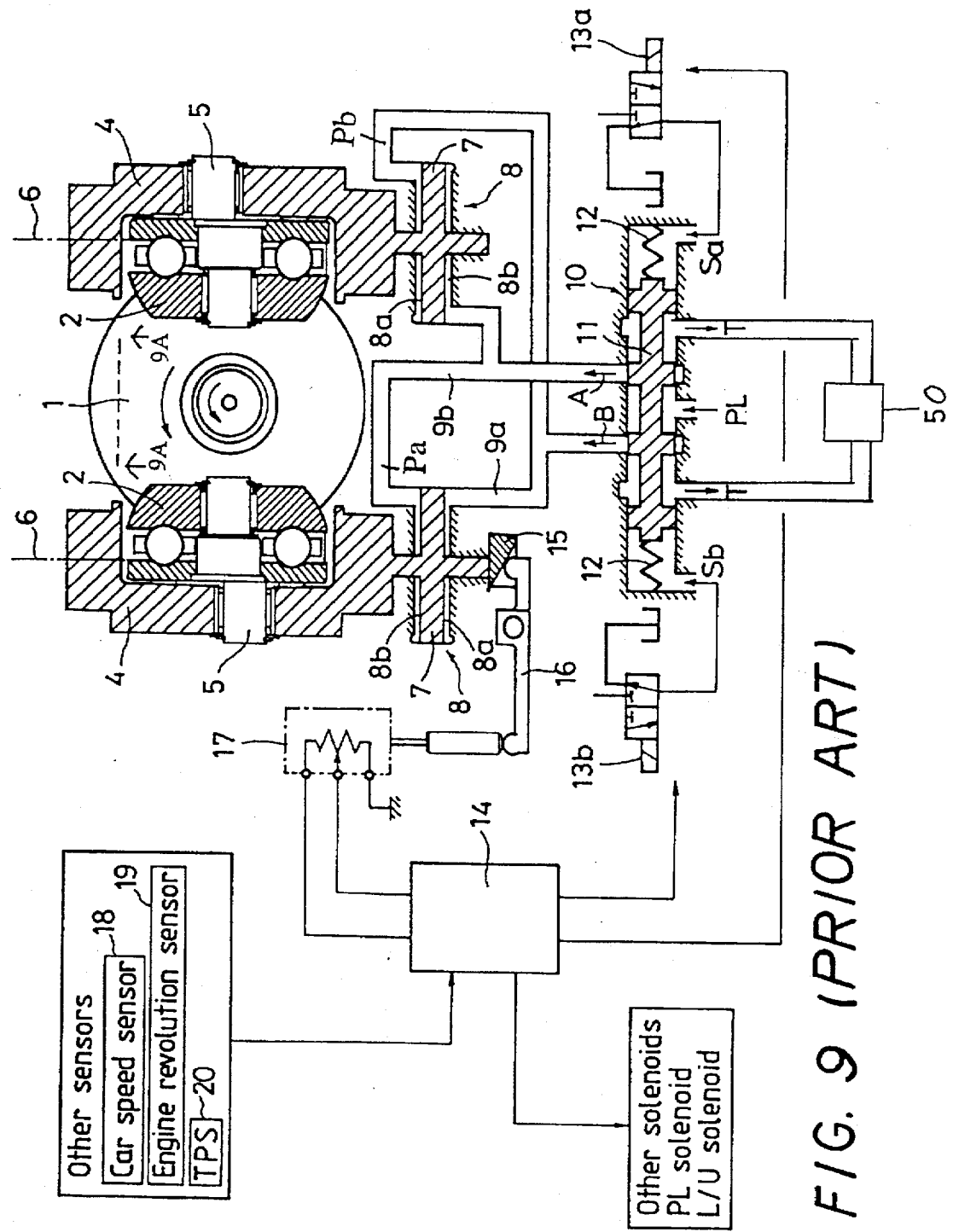
FIG. 9 is a schematic diagram showing the outline of the conventional toroidal continuous variable transmission.
Figure 9A:
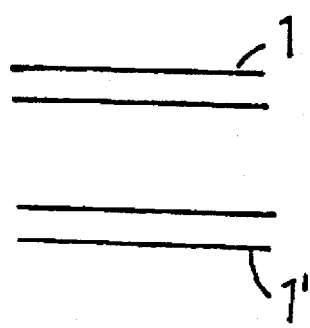
FIG. 9A is a schematic diagram along section 9A—9A of the conventional toroidal continuous variable transmission of FIG. 9.

As shown in FIGS. 1, 9 and 9A, the controller 14 includes a correction execution decision means 21 which checks the correction execution condition and, when it is met, outputs a signal; a transmission ratio variation decision means 33 which, upon receiving the signal from the correction execution decision means 21, checks if there is any change in the transmission ratio and outputs a corresponding signal; a transmission ratio error calculation means 22 that integrates with respect to time the difference between the transmission ratio and the target transmission ratio to calculate an integrated error; a first memory 23 that stores a table representing a correspondence, determined beforehand from experiments, between the integrated error and the amount of change in feedback gain; a feedback gain change calculation means 24 which, upon receiving a variation presence signal from the transmission ratio variation decision means 33, calculates the change of feedback gain corresponding to the calculated integrated error by using the correspondence table stored in the first memory 23 and which, when it receives a variation absence signal from the transmission ratio variation decision means 33, sets the change of feedback gain to zero; a second memory 25 that stores a table representing a correspondence, determined beforehand from experiments, between the integrated error and an amount of duty correction; a correction calculation means 26 which calculates an amount of duty correction corresponding to the calculated integrated error by using the correspondence table stored in the second memory 25; and a duty calculation means 27 which corrects the duty related to the difference between the transmission ratio and the target transmission ratio by using the amount of change of feedback gain and the amount of duty correction and then outputs the corrected duty to the solenoid valves 13a, 13b. The amount of duty correction corresponding to the integrated error may be calculated according to a map (correspondence table) obtained beforehand from experiments as described above, or it may be fixed to a minimum resolution unit of the output signal to the solenoid valves 13a, 13b.

The engine revolution sensor 19, accelerator depression sensor 28, pressure sensor 29 and shift position sensor 30 detect the engine revolution, the amount of accelerator depression, the engine suction pressure and the shift lever position, respectively, and then feed them to the correction execution decision means 21 in the controller 14. The correction execution decision means 21 decides that the correction execution condition is satisfied when the received engine revolution, accelerator depression amount and engine suction pressure are in a specified range and the drive position is in the parking range "P" or neutral range "N". When the correction execution condition is met, the target transmission ratio does not change but remains constant. The method of calculating the target transmission ratio and the actual transmission ratio is the same as the conventional one. The target transmission ratio represents an optimum transmission ratio at this moment, which is calculated by a target transmission ratio calculation means 31 in the controller 14 by using the car speed, engine revolution and throttle opening detected by the car speed sensor 18, engine revolution sensor 19 and throttle opening sensor 20. The actual transmission ratio is calculated by a transmission ratio calculation means 32 in the controller 14 from a synthesized displacement of the trunnions 4 detected by the potentiometer 17, i.e., the trunnions' combined displacement consisting of the displacement in the axial direction of the tilt axis 6 and the tilt angle about the tilt axis 6.

Figure 2:
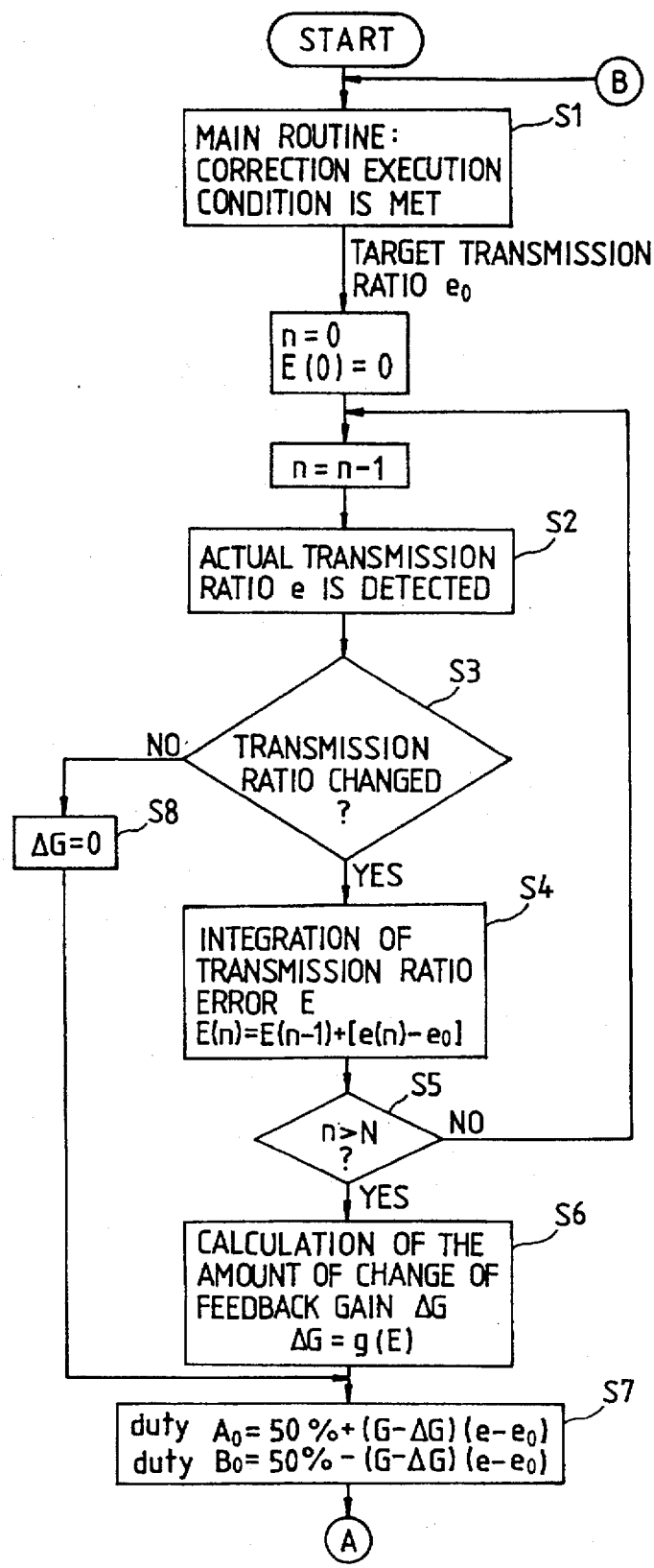
FIG. 2 is a flow chart showing a part of a correction execution procedure in the toroidal continuous variable transmission of this invention.
Figure 3:
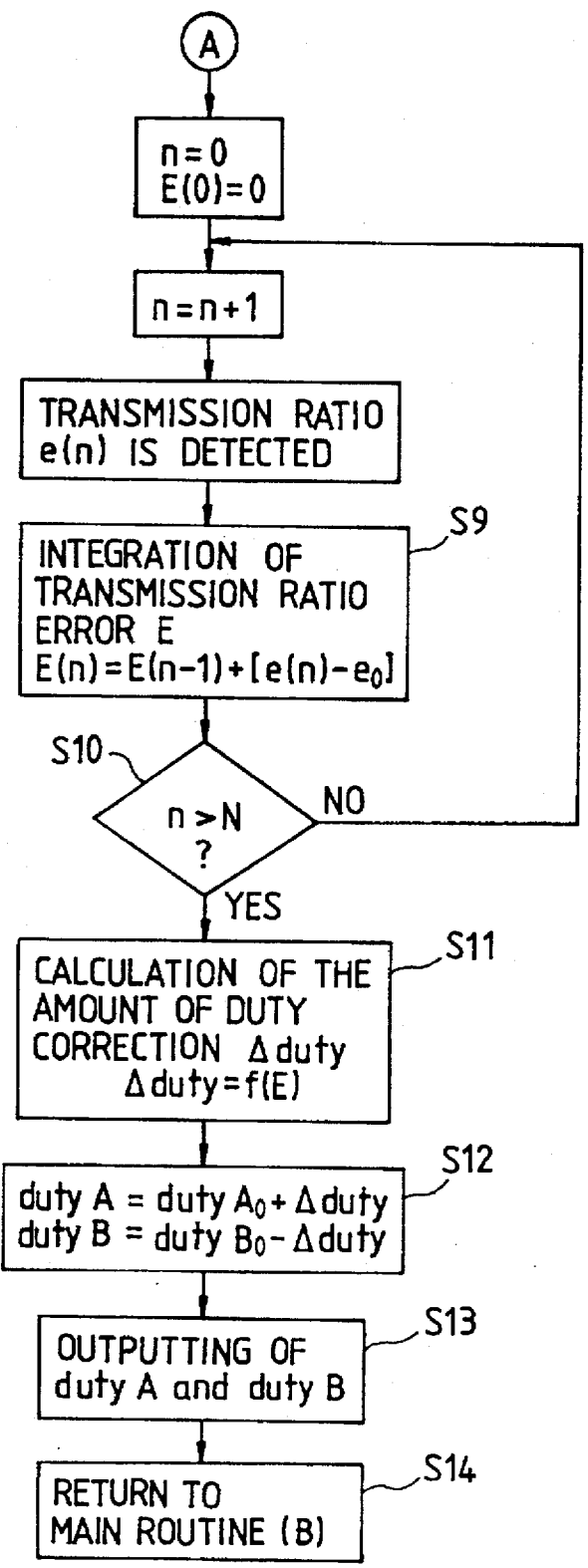
FIG. 3 is a flow chart showing the correction execution procedure following the flow chart of FIG. 2.

Next, the referring to the flow charts of FIGS. 2 and 3, we will offer explanation about the correction execution control as performed by the speed change control device of the toroidal continuous variable transmission of the first embodiment. When the error of the neutral position of the spool valve 10 is to be corrected, the predetermined condition, i.e., the correction execution condition must be met. First, the main routine checks if the engine is in the idling condition (S1). When the engine is found to be idling, the correction execution condition is satisfied. In that case, the initial setting is made, that is, the number of times n that the integrating calculation is repeated is set to n=0 and the value of integration E of the transmission ratio error is set to E(0)=0. Next, the transmission ratio e is detected (S2) and the difference ($e-e_0$) between the actual transmission ratio e and the target transmission ratio $e_0$, i.e., the transmission ratio error, is integrated (S4). The integration is repeated N times (S5). In the process of integration, a check is made to see if there is any variation in the transmission ratio (S3). When there is a variation in the transmission ratio, the integration is performed N times (S4, S5). After the integration calculation has been carried out N times, the amount of change of feedback gain $\Delta G$ corresponding to the magnitude of the integrated error E is calculated according to the map that was determined beforehand from experiments (S6). The duty $A_0$ and duty $B_0$ to be output to the solenoid valves 13a, 13b, respectively, are calculated from the following equation (1) (S7).

$$\text{duty } A_0 = 50\% + (G - \Delta G)(e - e_0)$$

$$\text{duty } B_0 = 50\% - (G - \Delta G)(e - e_0) \quad (1)$$

where G and $\Delta G$ are positive proportional constants.

When step 3 (S3) detects no change in the transmission ratio, the amount of change of feedback gain $\Delta G$ is set to $\Delta G = 0$ (S8). That is, the duty $A_0$ and duty $B_0$ are given as follows.

$$\text{duty } A_0 = 50\% + G(e - e_0)$$

$$\text{duty } B_0 = 50\% - G(e - e_0) \quad (2)$$

As can be seen from above, when there is a variation in the transmission ratio, the feedback gain is lowered as indicated by the equation (1). When there is no variation in the transmission ratio, the duty $A_0$ and duty $B_0$ are calculated with the normally set feedback gain, as indicated by the equation (2).

Next, the correction of the neutral position of the spool valve is explained. The initial setting is again performed by setting the number of times n that the integrating calculation is repeated to n=0 and the integrated value E of transmission ratio error to E(0)=0. The difference (e–$e_0$) between the actual transmission ratio e and the target transmission ratio $e_0$, i.e., the transmission ratio error, is integrated (S9). The integration calculation is repeated N times (S10). After the integration calculation has been performed N times, the amount of duty correction ($\Delta$duty) is calculated to correct the neutral position of the spool valve. In other words, the amount of duty correction ($\Delta$duty) corresponding to the integrated value E of the transmission ratio error calculated in step 9 is determined by using the map that was obtained from experiments (S11). Using the duty $A_0$ and duty $B_0$ based on the amount of change of feedback gain $\Delta$G calculated by step 6 and the amount of duty correction ($\Delta$duty) calculated in step 11, the following calculation is performed to determine the duty A and duty B to be output to the solenoid valves 13a, 13b (S12).

$$\text{duty } A = \text{duty } A_0 + \Delta\text{duty}$$

$$\text{duty } B = \text{duty } B_0 - \Delta\text{duty} \quad (3)$$

The duty A and duty B are output to the solenoid valves 13a, 13b, respectively (S13).

The processing returns to the start S1 of the main routine (S14). When the correction execution condition is satisfied, i.e., in the idling condition, the step 1 through step 14 are repeated. When there is a change in the transmission ratio, the control involves first lowering the feedback gain and, as the correction proceeds, raising the feedback gain. By repeating the feedback, the correction of the neutral position of the spool valve is rapidly performed.

Figure 4:
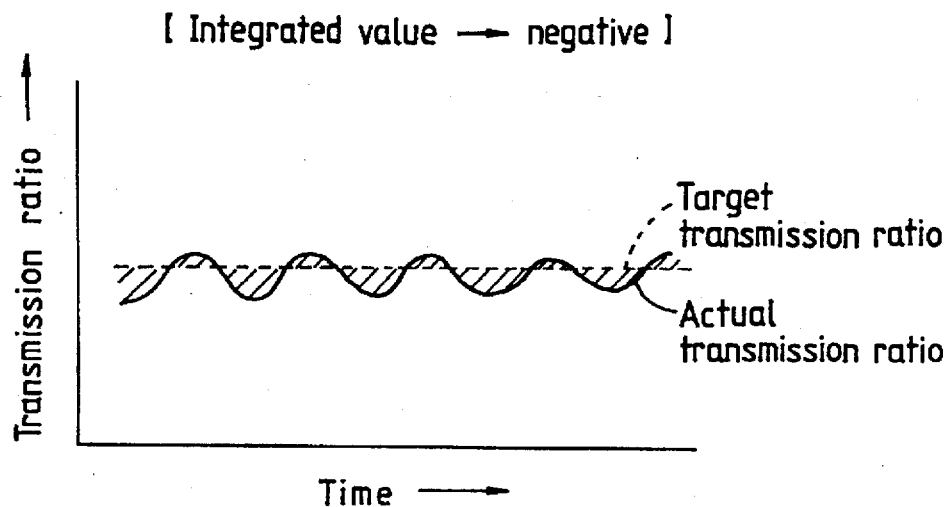
FIG. 4 is a graph showing an example change over time in the difference between the actual transmission ratio and the target transmission ratio when the variation of the transmission ratio is large.
Figure 5:
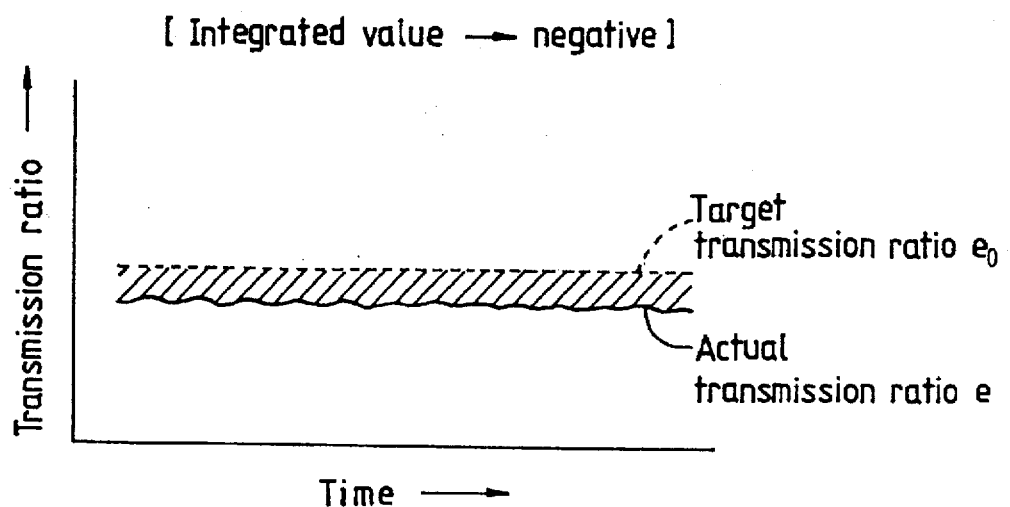
FIG. 5 is a graph showing an example change over time in the difference between the actual transmission ratio and the target transmission ratio when the variation of the transmission ratio is small.

Next, let us at changes over time of the transmission ratio as the transmission ratio converges on the target transmission ratio. FIGS. 4 and 5 show variations over time of the difference between the actual transmission ration and the target transmission ratio during the speed change operation. In both cases of FIGS. 4 and 5, it is seen that the difference between the actual transmission ratio and the target transmission ratio integrated over time (shaded area) is negative. When there is an error in the neutral position of the spool valve, the actual transmission ratio will oscillate near the target transmission ratio, as shown in FIG. 4, or it will become stable deviated from the target transmission ratio, as shown in FIG. 5. When at this time the variation of the transmission ratio is large, as shown in FIG. 4, the lowering of the feedback gain of the output signal from the controller 14 to the solenoid valves 13a, 13b below the normal setting value results in the state shown in FIG. 5. Hence, if the correction on the neutral position of the spool valve 10 is performed by lowering the feedback gain and then bringing it toward the normal setting value or raising it, it is possible to have the actual transmission ratio agree with the target transmission ratio quickly and completely.

Next, by referring to FIGS. 6, 7, 9, and 9A, a second embodiment of the speed change control device of the toroidal continuous variable transmission according to this invention is described. The speed change control device of the toroidal continuous variable transmission has the same configuration as the conventional one in FIGS. 9 and 9A with their only difference being the configuration of the controller 14.

Figure 7:
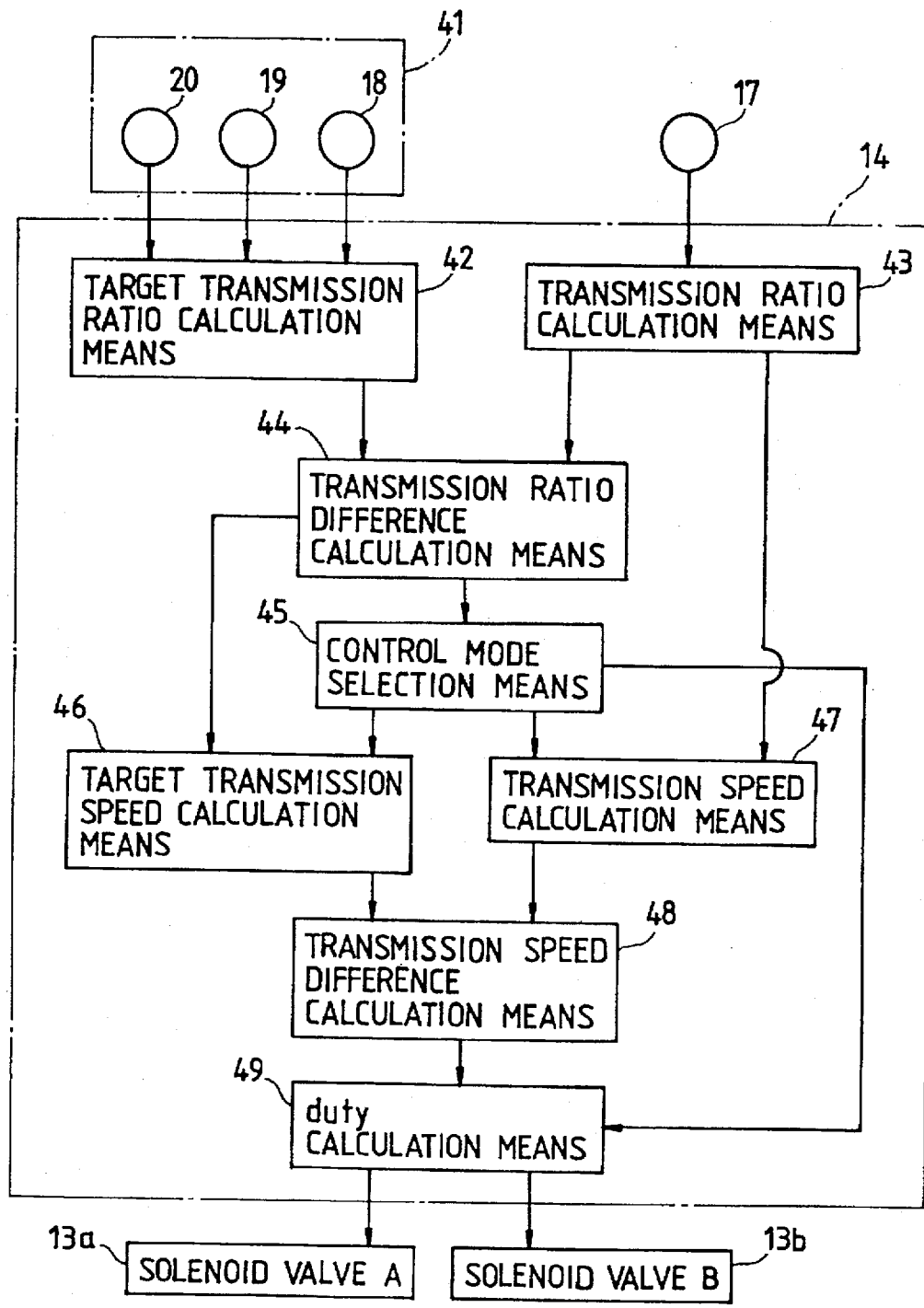
FIG. 7 is a function block diagram for the controller used in the toroidal continuous variable transmission of this invention.

The controller 14, as shown in FIG. 7, includes a target transmission ratio calculation means 42 that receives speed change information values detected by a speed change information detector 41 to calculate a target transmission ratio; a transmission ratio calculation means 43 which receives a synthetic displacement of the tilt axis 6 of the trunnions 4 detected by the potentiometer 17, i.e., the combined displacement made up of the displacement in the direction of the tilt axis 6 and the tilt angle about the tilt axis 6, to calculate the actual transmission ratio; a transmission ratio difference calculation means 44 that calculates the difference between the actual transmission ratio and the target transmission ratio and outputs a signal representing the difference; a control mode selection means 45 which checks whether the difference between the actual transmission ratio and the target transmission ratio is lower than a specified value and which, when the difference is lower than the specified value, selects a normal mode and, when it exceeds the specified value, selects a special mode; a target transmission speed calculation means 46 which calculates a target transmission speed corresponding to a signal supplied from the transmission ratio difference calculation means 44 during the special mode, i.e., a target transmission speed corresponding to the difference between the actual transmission ratio and the target transmission ratio; a transmission speed calculation means 47 which calculates a transmission speed by dividing by a sampling time the difference between a transmission ratio detected this time and a previously detected transmission ratio, these transmission ratios being calculated by the transmission ratio calculation means 43 during the special mode; a transmission speed difference calculation means 48 which calculates the difference between the transmission speed and the target transmission speed and outputs a signal representing the difference; and a duty calculation means 49 which, during the normal mode, calculates a duty proportional to the signal supplied from the transmission ratio difference calculation means 44, i.e., a duty proportional to the difference between the transmission ratio and the target transmission ratio and then outputs the duty to the solenoid valves 13a, 13b, and which, during the special mode, calculates a duty proportional to the supplied from the transmission speed difference calculation means 48, i.e., a duty proportional to the difference between the transmission speed and the target transmission speed and then outputs the duty to the solenoid valves 13a, 13b.

The speed change information detector 41 includes such sensors as a car speed sensor 18 for detecting the car speed, an engine revolution sensor 19 for detecting the engine revolution, and a throttle opening sensor 20 for detecting the throttle opening. The target transmission ratio calculation means 42 calculates an optimum transmission ratio from the car speed, engine revolution and throttle opening detected by the sensors 18, 19, 20 and sets it as a target transmission ratio. The transmission ratio calculation means 43 receives a synthetic displacement of the trunnions 4 detected by the potentiometer 17 and calculates the actual transmission ratio.

Figure 6:
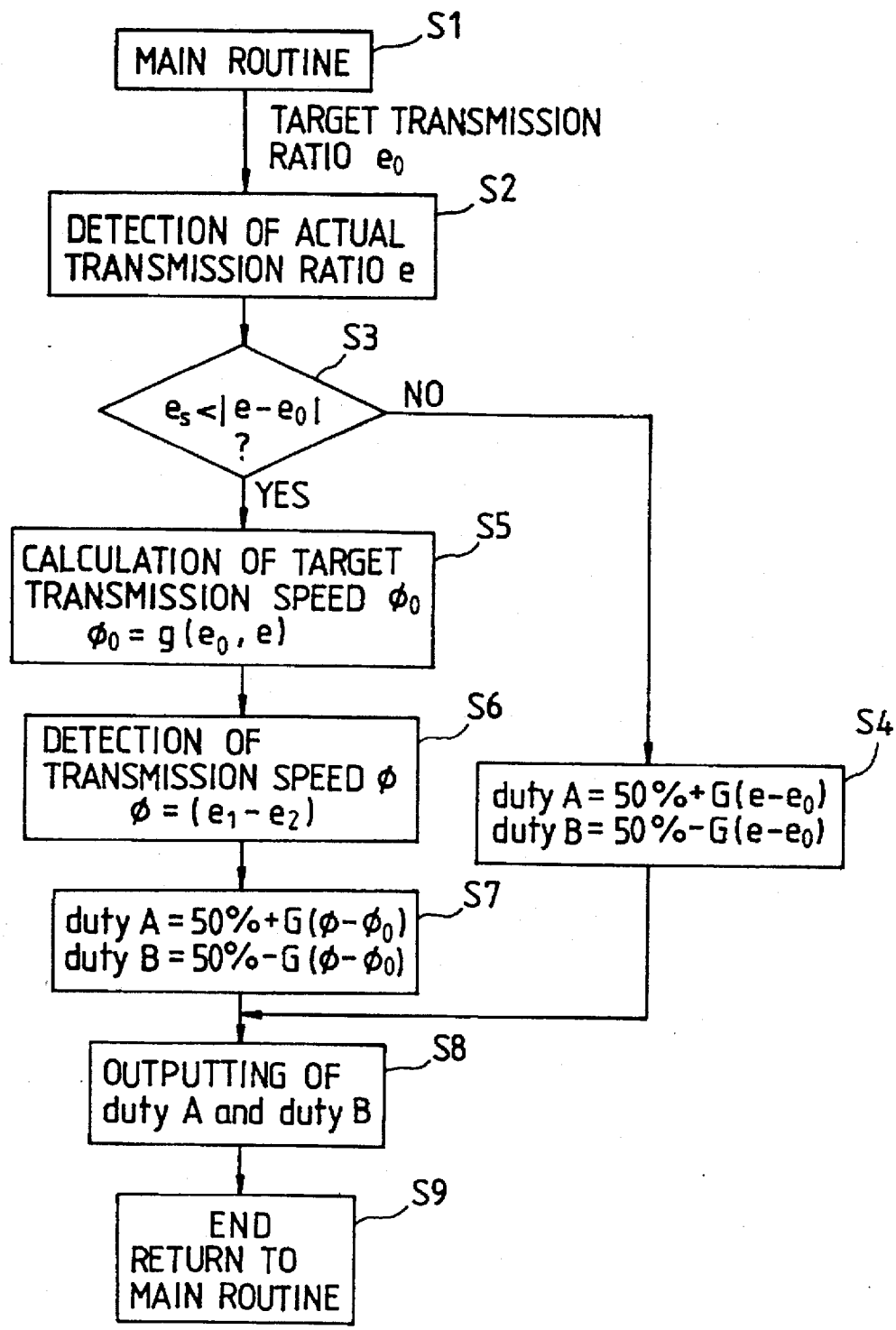
FIG. 6 is a flow chart for the toroidal continuous variable transmission of this invention.

Next, the procedure for speed change control as performed by the speed change control device is described by referring to the flow chart of FIG. 6. Before the speed change operation is initiated, the trunnions 4 are at the so-called neutral positions where the rotation axes of the power rollers 2 cross the rotation axes of the input disk 1 and the output disk.

First, the main routine is started. The speed change information detector 41 detects such speed change information as engine revolution, throttle opening and car speed.

Figure 10:
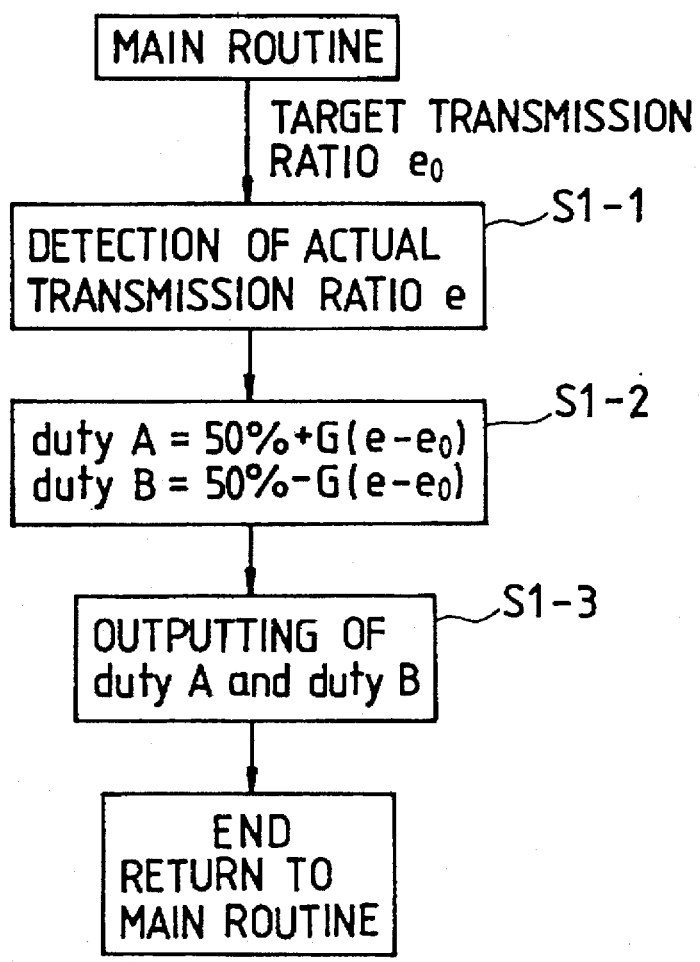
FIG. 10 is a flow chart for the speed change control of the conventional toroidal continuous variable transmission.
Figure 11:
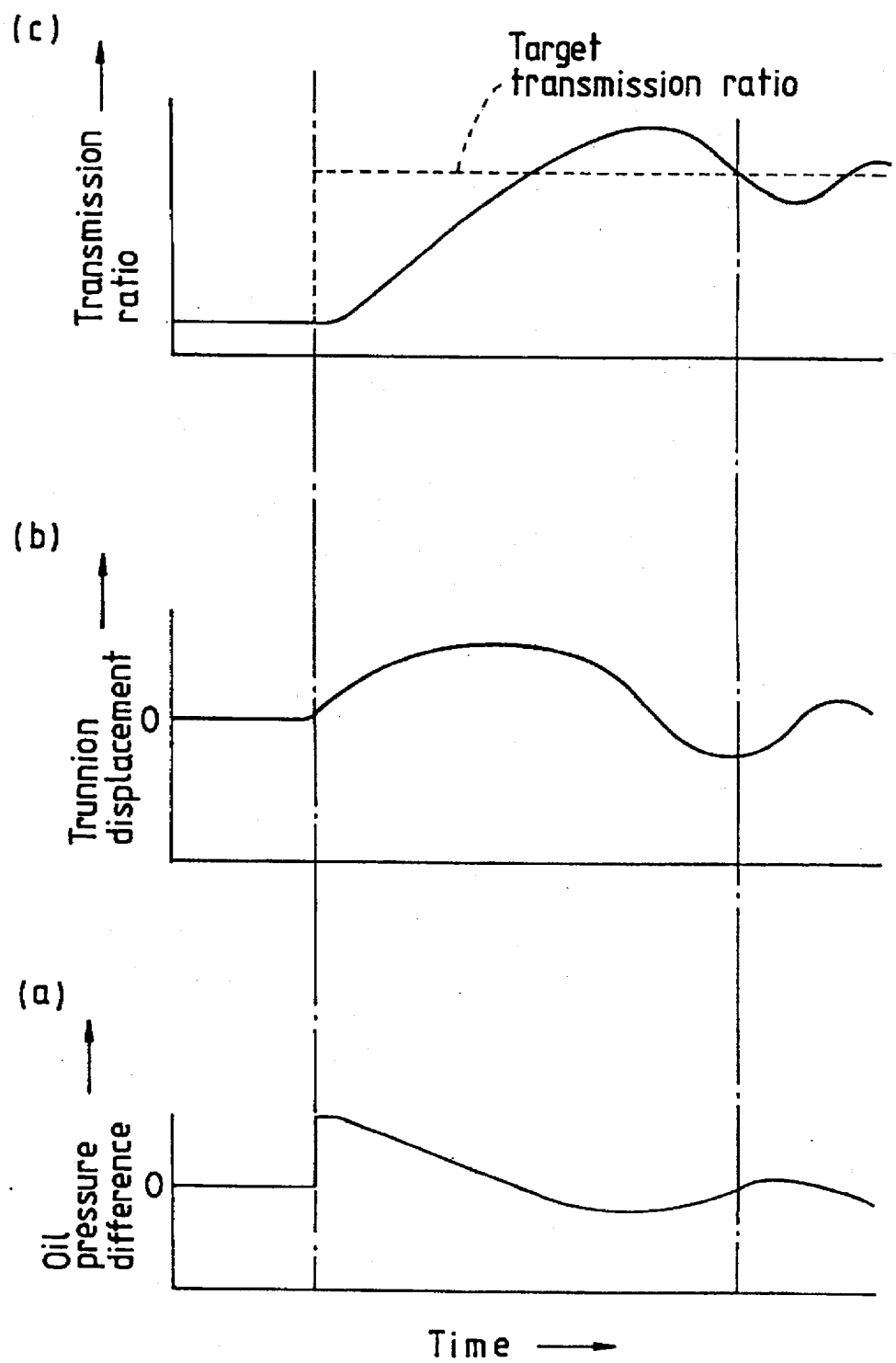
FIG. 11 is a graph showing the speed change operation of the conventional toroidal continuous variable transmission.

Based on these speed change information detected, the target transmission ratio calculation means 42 calculates an optimum transmission ratio and sets it as a target transmission ratio $e_0$ (S1). Then, a synthesized displacement of the tilt axis 6 of the trunnions 4 is detected by the potentiometer 17. Based on the synthesized displacement, the transmission ratio calculation means 43 calculates the actual transmission ratio e at this moment (S2). Next, the transmission ratio difference calculation means 44 calculates the difference $(e-e_0)$ between the target transmission ratio $e_0$ determined by step 1 and the actual transmission ratio e determined by step 2, and the control mode selection means 45 checks whether the absolute value of the difference $(e-e_0)$ is smaller than the specified value $e_s$ (S3). If the difference $(e-e_0)$ is smaller than the specified value, the normal mode is activated, performing the same control as the conventional one shown in FIG. 10. That is, the duty proportional to the difference $(e-e_0)$ between the transmission ratio and the target transmission ratio is calculated from the following formulas (S4).

$$\text{duty } A = 50\% + G(e-e_0)$$

$$\text{duty } B = 50\% - G(e-e_0)$$

In S3 or step 3, when the absolute value of the difference $(e-e_0)$ between the transmission ratio and the target transmission ratio exceeds the predetermined value $e_s$, the mode switches to the special mode, whereby the target transmission speed calculation means 46 calculates the target transmission speed $\phi_0$ corresponding to the difference $(e-e_0)$ (S5). That is, the target transmission speed $\phi_0$ is given as a function $g(e_0, e)$ of the transmission ratio and the target transmission ratio. Next, the transmission speed calculation means 47 calculates the transmission speed $\phi$ from the following formula (S6).

$$\phi = (e_1 - e_2)/t$$

where $e_1$ is a transmission ratio detected this time, $e_2$ is a previously detected transmission ratio, and t is a sampling time.

Next, the duty calculation means 49 calculates the duty proportional to the difference $(e-e_0)$ between the transmission ratio and the target transmission ratio as follows (S7).

$$\text{duty } A = 50\% + G(\phi - \phi_0)$$

$$\text{duty } B = 50\% - G(\phi - \phi_0)$$

The duty A and duty B calculated by S4 or step 4 are output to the solenoid valves 13a, 13b, respectively during the normal mode, i.e., when the difference $(e-e_0)$ between the transmission ratio and the target transmission ratio is small. During the special mode, i.e., when the difference $(e-e_0)$ between the transmission ratio and the target transmission ratio is large, the duty A and duty B calculated by step 7 (S7) are output to the solenoid valves 13a, 13b, respectively. The processing returns to the start (S1) of the main routine and the speed change operation is repeated (S9).

Figure 8:
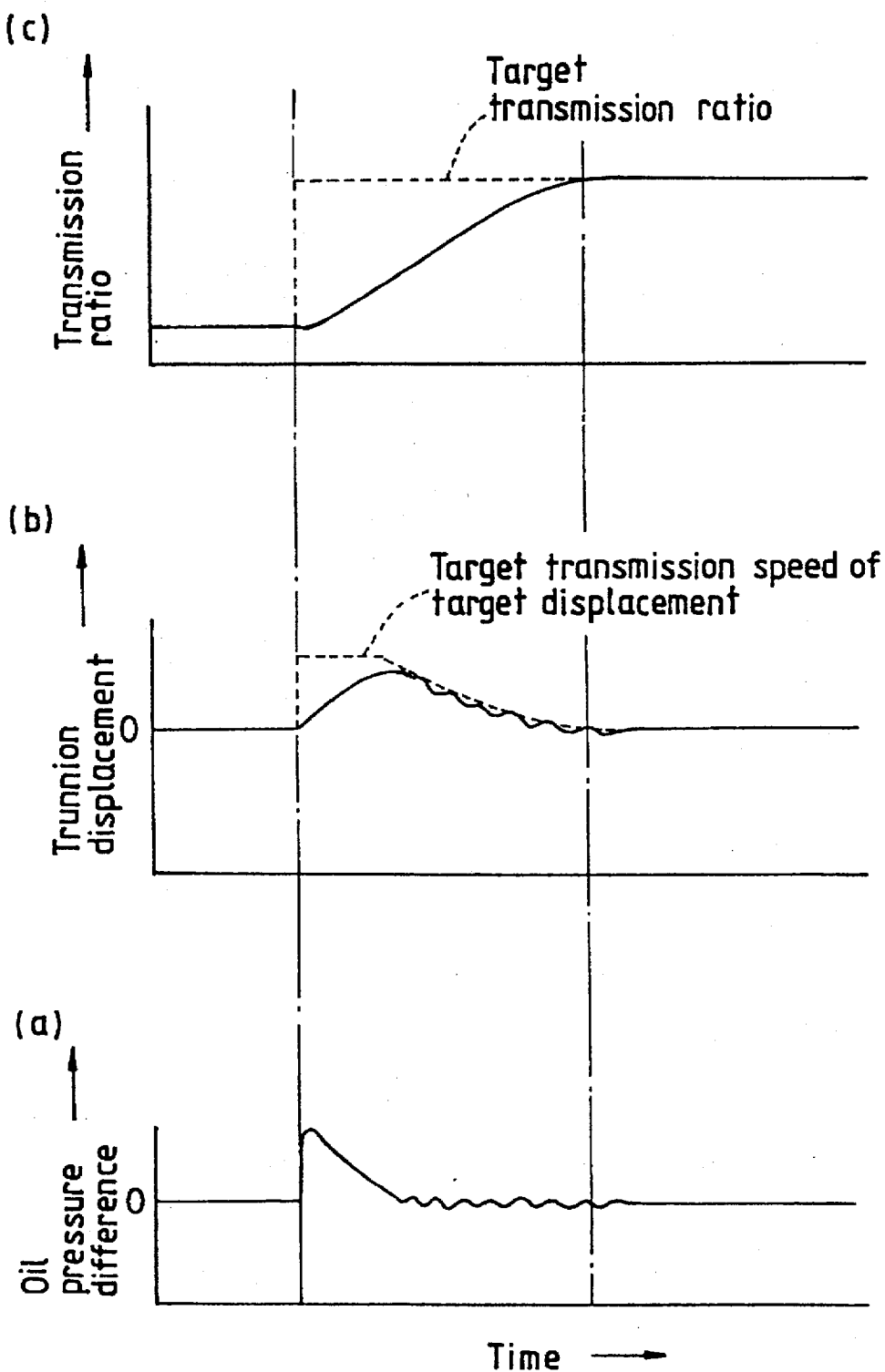
FIG. 8 is a graph showing the speed change operation of the toroidal continuous variable transmission of this invention.

Next, by referring to FIG. 8, the speed change operation of the speed change control device is explained. FIG. 8(a) is a graph showing the change over time of the oil pressure difference between the pilot pressures Sa and Sb acting on the ends of the spool valve 10; FIG. 8(b) is a graph showing the change over time of the displacement of the trunnions 4 in the direction of the tilt shaft; and FIG. 8(c) is a graph showing the change over time of the transmission ratio.

In this toroidal continuous variable transmission, because the target transmission speed $\phi_0$ is set according to the difference $(e-e_0)$ between the transmission ratio and the target transmission ratio, the target transmission speed $\phi_0$ increases when the difference $(e-e_0)$ between the transmission ratio and the target transmission ratio is large and decreases when the difference $(e-e_0)$ is small. When the actual transmission ratio e agrees with the target transmission ratio $e_0$, the difference $(e-e_0)$ becomes zero, causing the target transmission speed $\phi_0$ to become zero.

The transmission speed $\phi$ on the other hand depends on the displacement of the trunnions 4 in the direction of the tilt shaft. That is, the larger the displacement of the trunnions 4 in the direction of the tilt shaft, the larger the transmission speed $\phi$. The smaller the displacement in the direction of the tilt shaft, the smaller the transmission speed $\phi$. For this reason, controlling the transmission speed $\phi$ means indirectly controlling the displacement of the trunnions 4 in the direction of the tilt shaft. Hence, when the target transmission ratio $e_0$ changes as shown by a dashed line in FIG. 8(c), the target displacement of the trunnions 4, i.e., the target transmission speed $\phi_0$ changes as indicated by a dashed line in FIG. 8(b). That is, the target transmission speed $\phi_0$ is so set that it is maximum immediately after the start of the speed change operation and progressively decreases until it is zero when the actual transmission ratio e agrees with the target transmission ratio $e_0$.

Now, the control operation at time of a kickdown when the car is traveling at the maximum speed-increase ratio is explained. When the accelerator is kicked down, the target transmission ratio $e_0$ steps up suddenly from the speed-increase side to the speed-decrease side, as shown by the dashed line in FIG. 8(c). At this time, because the absolute value of the difference $(e-e_0)$ between the transmission ratio and the target transmission ratio exceeds the predetermined value $e_s$, the control mode switches to the special mode, whereby the target transmission speed $\phi_0$ corresponding to the difference $(e-e_0)$ is set. Then, the duty A and duty B proportional to the difference $(\phi-\phi_0)$ between the transmission speed and the target transmission speed are output to the solenoid valves 13a, 13b, respectively. That is, duty B becomes greater than duty A (duty A<duty B), causing the oil pressure Pb to be supplied to the speed-decrease side cylinder chamber 8b and allowing the oil pressure Pa to be discharged from the speed-increase side cylinder chamber 8a. This results in Pa<Pb, causing the trunnion 4 on the left in FIG. 9 to start moving down greatly from the neutral position. As the trunnion 4 moves down, the transmission speed $\phi$ approaches the target transmission speed $\phi_0$, reducing the difference between duty A and duty B and therefore the oil pressure difference between the cylinder chambers 8a and 8b. This in turn decelerates the downward displacement of the trunnion 4 until it stops.

The transmission speed $\phi$ at that moment is slightly larger than the target transmission speed $\phi_0$, so that the magnitudes of duty A and duty B are reversed (duty A>duty B). When duty A is greater than duty B, the trunnion 4 on the left in FIG. 9 reverses its movement and starts moving up toward the neutral position. While the trunnion 4 on the left is moving up, the transmission speed $\phi$ decreases until it is lower than the target transmission speed $\phi_0$ again, at which time the duty A and duty B reverse in magnitude (duty A<duty B), reversing the direction of displacement of the trunnion 4. In this way, each time the magnitude relation between duty A and duty B, i.e., the pressure difference between the pilot pressures Sa and Sb acting on the ends of the spool valve 10 repeats slight changes, as shown in FIG.

8(a), the trunnion 4 oscillates vertically with its amplitude decreasing gradually and approaches the neutral position, as shown in FIG. 8(b). At the same time, the transmission ratio also approaches the target transmission ratio. When the trunnion 4 returns to the neutral position, the actual transmission ratio e agrees with the target transmission ratio $e_0$, as shown in FIG. 8(c). In this way, the trunnion 4 operates as indicated by the solid line in FIG. 8(b), so that the actual transmission ratio e (solid line) smoothly converges toward the target transmission ratio $e_0$ (dashed line) as shown in FIG. 8(c), reliably preventing an overshoot of speed change control.

When the difference ($e-e_0$) between the transmission ratio and the target transmission ratio is lower than the specified value, the control switches from the one that is based on the difference ($\phi-\phi_0$) between the transmission speed and the target transmission speed to the one that is same as the conventional control. That is, the control switches to the conventional one that controls the output signals to the solenoid valves 13a, 13b in such a way that the pressure difference between the pilot pressures Sa and Sb acting on the ends of the spool valve 10 is proportional to the difference ($e-e_0$) between the transmission ratio and the target transmission ratio. Because the actual transmission ratio e can be detected with higher precision than can the transmission speed $\phi$, it is possible to perform the speed change control with high accuracy even in a region where the difference ($e-e_0$) between the actual transmission ratio and the target transmission ratio is very small.

What is claimed is:

1. A toroidal continuous variable transmission comprising:

an input disk;

an output disk arranged opposite the input disk;

a pair of power rollers which continuously change and transmit the rotation of the input disk to the output disk according to changes in a tilt angle of the power rollers with respect to the input disk and the output disk;

a pair of trunnions that each rotatably support the power rollers and can be displaced in the direction of a tilt axis;

hydraulic cylinders each having two cylinder chambers to move the trunnions in the direction of the tilt axis;

a spool valve having a spool to regulate oil pressure supplied to the hydraulic cylinders, the spool valve being adapted to cut off the cylinder chambers when the spool is at a neutral position and to selectively communicate the cylinder chambers to an oil pressure source and a tank when the spool is shifted from the neutral position;

solenoid valves that control the positions of the spool; and a controller that outputs to the solenoid valves duties corresponding to the difference between an actual transmission ratio and a target transmission ratio;

wherein when a correction execution condition is satisfied, the controller performs a correction control on the neutral position of the spool valve by integrating with respect to time the difference between the actual transmission ratio and the target transmission ratio to calculate an integrated error, determining an amount of duty correction that corresponds to the error of the neutral position of the spool valve based on the integrated error, and correcting the duty with the amount of duty correction thus determined.

2. A toroidal continuous variable transmission according to claim 1, wherein when the correction execution condition is satisfied and the transmission ratio is changing, the controller performs control in such a way as to lower a feedback gain supplied to the solenoid valves and, as the correction proceeds, to raise the feedback gain.

3. A toroidal continuous variable transmission according to claim 1, wherein the controller includes:

a correction execution decision means that outputs a signal when the correction execution condition is found to be satisfied; a transmission ratio change presence/absence decision means that, in response to the signal from the correction execution decision means, decides whether there is a change in the transmission ratio and outputs a signal representing the decision; a transmission ratio error calculation means to calculate an integrated error by integrating with respect to time the difference between the actual transmission ratio and the target transmission ratio;

a first memory to store a table representing a predetermined correspondence between the integrated error and the amount of change of feedback gain; a feedback gain change calculation means which, when it receives a change presence signal from the transmission ratio change presence/absence decision means, calculates the amount of change of feedback gain corresponding to the integrated error by using the correspondence table stored in the first memory and which, when it receives a change absence signal from the transmission ratio change presence/absence decision means, sets the amount of change of feedback gain to zero; a second memory that stores a table representing a predetermined correspondence between the integrated error and an amount of duty correction;

a correction calculation means that calculates an amount of duty correction corresponding to the integrated error by using the correspondence table stored in the second memory; and a duty calculation means that corrects the duty based on the amount of change of feedback gain and the amount of duty correction and then outputs the corrected duty to the solenoid valves.

4. A toroidal continuous variable transmission according to claim 3, wherein the correction execution condition is satisfied when the engine is idling.

5. A toroidal continuous variable transmission comprising:

an input disk;

an output disk arranged opposite the input disk;

a pair of power rollers which continuously change and transmit the rotation of the input disk to the output disk according to changes in a tilt angle of the power rollers with respect to the input disk and the output disk;

a pair of trunnions that each rotatably support the power rollers and can be displaced in the direction of a tilt axis;

hydraulic cylinders each having two cylinder chambers to move the trunnions in the direction of the tilt axis;

a spool valve having a spool to regulate oil pressures supplied to the hydraulic cylinders, the spool valve being adapted to cut off the cylinder chambers when the spool is at a neutral position and to selectively communicate the cylinder chambers to an oil pressure source and a tank when the spool is shifted from the neutral position;

solenoid valves that control pilot pressures acting on the ends of the spool; and a controller that sets a target transmission speed according to the difference between an actual transmission ratio and a target transmission ratio and controls output signals to the solenoid valves in such a way that the difference between the pilot pressures acting on the ends of the spool is proportional to the difference between the actual transmission speed and the target transmission speed.

6. A toroidal continuous variable transmission according to claim 5, wherein when the controller receives a signal indicating that the difference between the actual transmission ratio and the target transmission ratio exceeds a specified value, the controller sets the target transmission speed according to the difference between the actual transmission ratio and the target transmission ratio and controls output signals to the solenoid valves in such a way that the pressure difference between the pilot pressures acting on the ends of the spools is proportional to the difference between the transmission speed and the target transmission speed, and when it receives a signal indicating that the difference between the actual transmission ratio and the target transmission ratio is smaller than the specified value, the controller controls output signals to the solenoid valves in such a way that the difference between the pilot pressures acting on the ends of the spool is proportional to the difference between the actual transmission ratio and the target transmission ratio.

7. A toroidal continuous variable transmission according to claim 5, wherein the controller includes:

a transmission ratio difference calculation means which calculates the difference between the actual transmission ratio and the target transmission ratio and outputs a signal representing the difference; a control mode selection means which checks if the difference between the actual transmission ratio and the target transmission ratio is smaller than a specified value, and which, when the difference is smaller than the specified value, selects a normal mode and, when the difference exceeds the specified value, selects a special mode; a target transmission speed calculation means which, during the special mode, calculates the target transmission speed according to the signal from the transmission ratio difference calculation means; a transmission speed calculation means which, during the special mode, calculates the transmission speed by dividing the difference between a transmission ratio detected this time and a previously detected transmission ratio by a sampling time; a transmission speed difference calculation means which calculates the difference between the transmission speed and the target transmission speed and outputs a signal representing the difference; and a duty calculation means which, during the normal mode, calculates a duty proportional to the signal supplied from the transmission ratio difference calculation means and outputs the calculated duty to the solenoid valves and which, during the special mode, calculates a duty proportional to the signal supplied from the transmission speed difference calculation means and outputs the calculated duty to the solenoid valves.

* * * * *